US007979356B2

(12) United States Patent
Dupre et al.

(10) Patent No.: US 7,979,356 B2
(45) Date of Patent: Jul. 12, 2011

(54) METHOD FOR PAYING INVOICES

(76) Inventors: William J. Dupre, Downers Grove, IL (US); John G. McGill, Naperville, IL (US)

( * ) Notice: Subject to any disclaimer, the term of this patent is extended or adjusted under 35 U.S.C. 154(b) by 0 days.

(21) Appl. No.: 12/409,290

(22) Filed: Mar. 23, 2009

(65) Prior Publication Data

US 2009/0198583 A1 Aug. 6, 2009

Related U.S. Application Data

(63) Continuation of application No. 10/727,783, filed on Dec. 4, 2003, now abandoned.

(51) Int. Cl.
*G06Q 20/00* (2006.01)

(52) U.S. Cl. ................ 705/63; 705/73; 705/64; 705/77; 705/78

(58) Field of Classification Search .................... 705/63, 705/64, 73, 77, 78
See application file for complete search history.

(56) References Cited

U.S. PATENT DOCUMENTS

2002/0128967 A1 9/2002 Meyer et al.

OTHER PUBLICATIONS

The Bank Credit Card Business, 2nd Edition, American Bankers Association, 1996.

*Primary Examiner* — Andrew J. Fischer
*Assistant Examiner* — Joshua Murdough
(74) *Attorney, Agent, or Firm* — Kim A. Jacklin

(57) ABSTRACT

For an organization having a central station and a plurality of distributed outlets, each of the outlets having a cashier's terminal, each of the cashier's terminals coupled to a respective point-of-sale (POS) controller, a method of permitting a billee to pay an invoice issued by a biller is disclosed.

28 Claims, 2 Drawing Sheets

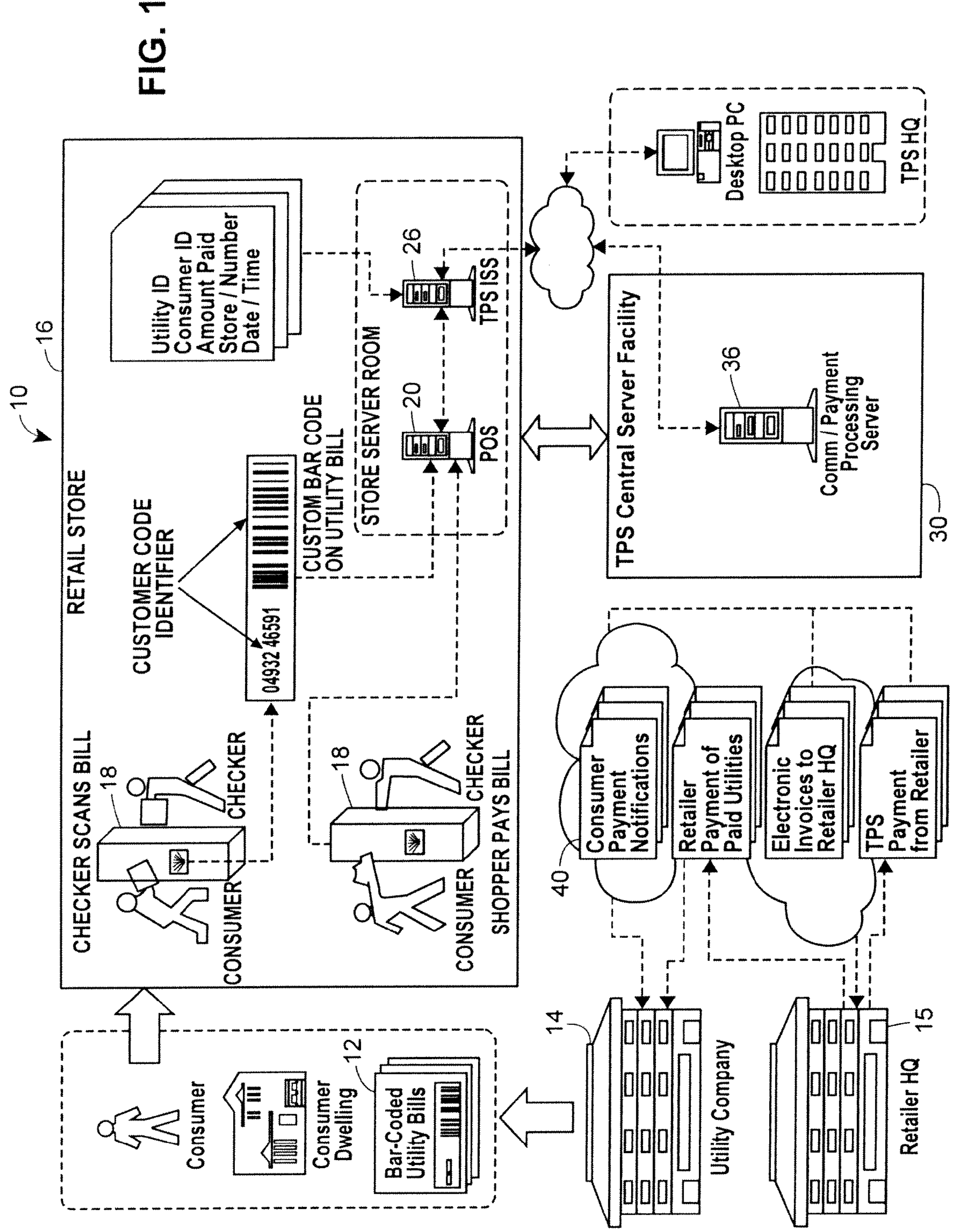
FIG. 1
10
16
RETAIL STORE
CHECKER SCANS BILL
18
CONSUMER
CHECKER
CUSTOMER CODE IDENTIFIER
04932 46591
CUSTOM BAR CODE ON UTILITY BILL
18
CONSUMER
CHECKER
SHOPPER PAYS BILL
STORE SERVER ROOM
20
POS
26
TPS ISS
Utility ID
Consumer ID
Amount Paid
Store / Number
Date / Time
Desktop PC
TPS HQ
TPS Central Server Facility
36
Comm / Payment
Processing
Server
30
40
Consumer Payment Notifications
Retailer Payment of Paid Utilities
Electronic Invoices to Retailer HQ
TPS Payment from Retailer
Consumer
Consumer Dwelling
12
Bar-Coded Utility Bills
14
Utility Company
15
Retailer HQ

METHOD FOR PAYING INVOICES

CROSS-REFERENCE TO RELATED APPLICATION

This patent application is a continuation of U.S. Ser. No. 10/727,783 filed Dec. 4, 2003.

TECHNICAL FIELD

The present invention relates to a system and method of permitting a customer to pay an invoice, such as a utility invoice, at a retail outlet, such as a grocery store.

BACKGROUND OF THE INVENTION

Meyer et al., U.S. Patent Application Publication No. 2002/0128967 discloses a system where a customer pays an invoice issued by a biller, such as a utility company, at a retail location, such as a supermarket. However, this system requires that the utility's invoice includes a bar code identifying both the utility as well as the customer.

Additionally, this system requires extensive integration with the supermarket's cash register system.

Further, this system requires that the supermarket forward the payment through the Federal Reserve Automated Clearing House (ACH) Network.

Still further, this system makes no provision for charging the consumer for this service.

The present invention is provided to solve these and other problems.

BRIEF DESCRIPTION OF THE DRAWINGS

Other advantages and aspects of the present invention will become apparent upon reading the following description of the drawings and detailed description of the invention.

FIG. 1 is a block diagram of the present invention.

DETAILED DESCRIPTION OF THE INVENTION

Figure 2:
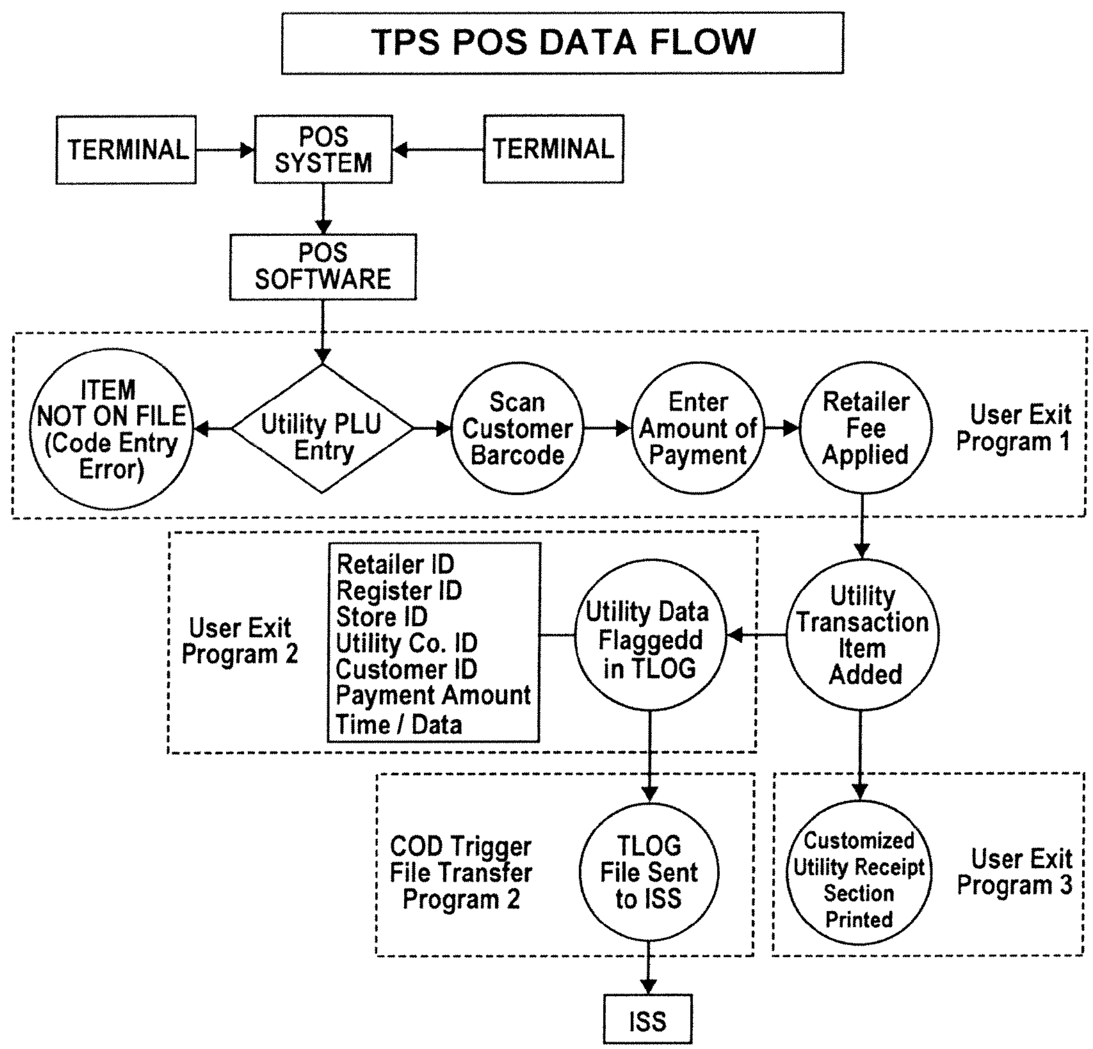
FIG. 2 is a process flow diagram of one aspect of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A system 10 for permitting a customer billee, such as an individual, to pay an invoice 12 generated by a biller 14, such as from a utility company also known as a utility service provider, at a retail outlet of an organization, such as a retail grocery store of a grocery store chain, is illustrated in FIG. 1.

The grocery store chain has a central station 15, such as its headquarters, and a plurality of distributed outlets 16. Each of the outlets 16 typically has a plurality of cashier's terminals 18. Each of the cashier's terminals 18 is coupled to a conventional point-of-sale (POS) controller 20, which is part of the store's computer system.

The invoice 12 is issued to the customer, either by regular mail, by e-mail, or otherwise. The customer goes to the outlet 16, possibly selects various items to purchase, such as groceries, and takes the selected items, if any, and the invoice to the cashier's terminal 18.

An invoice transaction is conducted by a cashier entering data identifying the biller and the billee into the cashier's terminal 18. Specifically, the biller may be identified by entering a Product Look-Up Code (PLC) for the biller. Alternatively, the biller may be identified by scanning a bar-code identification of the biller, which bar-code could be printed on the invoice. The customer is identified by entering a customer code identifier, such as the customer's account number. This may be done either by manually entering the account number via a key pad, or by scanning a bar code on the invoice.

The cashier also enters data indicating an amount of money to be paid by the billee towards the invoice into the cashier's terminal. The billee may choose to pay some or all of the invoiced amount. This may be repeated for other invoices, as well.

If the billee also desires to purchase one or more other items from the outlet 16, an other transaction is conducted by the cashier entering data identifying the one or more other items to be purchased into the cashier's terminal 18.

The POS controller 20 determines a total amount of money due as a result of the invoice transaction and the other transaction, and the billee tenders payment for the amount due. The POS controller 20 creates an electronic transaction log including an invoice transaction record of the invoice transaction and, if one or more other items were purchased, an other transaction record of the one or more other items purchased. The POS controller 20 flags the invoice transaction record, and transmits the transaction log from the POS controller 20 to a processing server 26.

The processing server 26 strips the invoice transaction record from the transmitted transaction log, and transmits the stripped invoice transaction record from the processing server 26 to a central server 30. The central server 30 performs both a communication function as well as a payment processing function. The central server may include a single server 36 to perform these functions, or it may include one or more dedicated communication server(s) and one or more dedicated payment processing server(s). The payment processing function gathers multiple stripped invoice transaction records, relating to multiple invoice payments, to multiple billers, over a period of time. Periodically, the central server 30 determines from the transmitted, stripped invoice transaction records, the amount of payment due to each of the particular billers, and the central server 30 electronically instructs the central station 15 to forward payment to the appropriate biller. Payment by the central station 15 to the particular billers can be done, as desired, such as by check, by wire, or otherwise.

The central server 30 also generates an electronic notification 40 to each of the billers, indicating the amount paid by the respective billees towards their respective invoices.

The transaction log may include a plurality of transaction records, with each of the transaction records having a respective invoice transaction record and other transaction record.

In the preferred embodiment, the processing server 26 and the central server 30 are operated by a third-party. Accordingly, a service fee is added to the amount the customer wants to pay to the biller, and thus this amount is added to the total amount of money the customer tenders to the cashier. This service fee is split between the grocery chain and the third-party. To transfer the third-party's share from the grocery, which received the service fee from the customer, to the third-party, the central server 30 electronically instructs the central station 15 to pay the third-party its share. This payment can be done by check, by wire, or otherwise.

The transaction log is transmitted to the processing server on a daily basis, such as following the normal end-of-day (EOD) run.

The stripped invoice transaction record is transmitted to the central server 30 when the invoice transaction record has been stripped from the transaction log.

The stripped invoice transaction record is transmitted from the processing server 26 to the central server 30 by a direct modem connection. Alternatively, the stripped invoice transaction record is transmitted from the processing server 26 to the central server 30 by an internet connection.

In the preferred embodiment, each of the outlets 16 has a plurality of cashier's terminals 18 coupled to a respective POS controller 20.

Following the transaction, the cashier's terminal generates a receipt for the customer, identifying both payment of the utility invoice, as well as payment for the other items, if any, purchased.

The present invention can be accomplished with no intrusion into the outlet's existing computer system, other than a minor modification of the software in the POS controller 20. These modifications will now be described with reference to FIG. 2.

A first modification is identified as User Exit Program 1. According to this modification, the POS controller software is modified to receive the PLU code of the biller issuing the invoice to be paid, and to determine the identity of the biller. If the POS controller does not recognize the PLU code, an error message is generated. Otherwise, the POS controller receives the data identifying the customer. The POS controller then receives data identifying the amount to be paid towards the invoice, and then adds the service fee.

A second modification is identified as User Exit Program 2. According to this modification, once the utility transaction item has been added, the POS controller flags the utility transaction in the transaction log.

A third modification is identified as User Exit Program 3. According to this modification, information regarding the utility payment is added to the otherwise conventional receipt.

A fourth modification is identified as User Exit Program 4. According to this modification, the POS controller transmits the transaction log to the processing server when the conventional EOD routine is run.

In an alternative embodiment, the POS controller 20 can be modified to transmit to the processing server 26 only those transaction logs including an invoice transaction record.

In a further alternative embodiment, the POS controller 20 can be modified to transmit to the processing server 26 only the invoice transaction record.

In a still further alternative embodiment, the processing server 26 and the central server 30 can be eliminated, and the POS controller 20 is modified to directly instruct the central station 15 to pay the biller.

While the specific embodiments have been illustrated and described, numerous modifications come to mind without markedly departing from the spirit of the invention. The scope of protection is only intended to be limited by the scope of the accompanying claims.

We claim:

1. A method performed by a point of sale (POS) system at a retail store to enable payment of a utility invoice, the POS system comprising a POS controller coupled to a cashier terminal and to a communication device, the method comprising:
- receiving at the POS controller a product look-up code (PLU) supplied by the cashier terminal;
- recognizing the PLU as being associated with a utility service provider;
- accepting at the POS controller a customer code identifier supplied by the cashier terminal in response to recognizing the PLU as being associated with a utility service provider;
- accepting at the POS controller a utility payment amount supplied by the cashier terminal, at least a portion of the utility payment amount being at least a portion of the cost of a utility service provided to a customer; and
- determining an identity of the associated utility service provider using the PLU;
- using the communication device to supply the customer code identifier, the identity of the utility service provider, and the utility payment amount to a central station coupled to the POS system for causing a quantity of money to be sent to the utility service provider on behalf of the customer.

2. The method of claim 1 further comprising:
- using the POS controller to cause a receipt to be printed by the cashier terminal that identifies the utility payment amount, the identity of the utility service provider and the customer code identifier.

3. The method of claim 1 wherein the customer code identifier comprises a customer account number.

4. The method of claim 3 further comprising:
- using the POS controller to cause a receipt to be printed by the cashier terminal that identifies the utility payment amount, the identity of the utility service provider and the customer account number.

5. The method of claim 4 further comprising:
- using the POS controller to cause the cashier terminal to print information about purchases made by the customer on the receipt.

6. The method of claim 1, wherein the customer account number, the identity of the utility service provider and the utility payment amount comprises payment information.

7. The method of claim 6, further comprising:
- using the POS controller to add a service fee to the utility payment amount.

8. The method of claim 6, wherein the quantity of money is a first quantity of money, the method further comprising:
- using the POS controller to add a service fee to the utility payment amount, wherein the central station causes a second quantity of money equal to the service fee to be paid to the payment service.

9. The method of claim 7, further comprising:
- using the POS controller to cause a receipt to be printed by the cashier terminal that identifies the service fee, the utility payment amount, the identity of the utility service provider and the customer account number.

10. The method of claim 1, wherein the cashier terminal comprises a scanning device coupled to a cash register, the method further comprising:
- entering the customer code identifier into the cash register using the scanning device, wherein the customer code identifier is formatted as a barcode.

11. The method of claim 1, wherein the cashier terminal comprises a keypad coupled to a cash register, the method further comprising:
- entering the customer code identifier into the cash register using the keypad, wherein the customer code identifier is formatted as a set of characters.

12. A point of sale (POS) system at a retail store that enables payment of a utility invoice, the POS system comprising:
- a processor programmed to recognize a PLU supplied to the processor as being associated with a utility service provider, to accept a customer code identifier in response to recognizing the PLU as being associated with a utility service provider, to determine the identity of the utility service provider associated with the PLU and to accept a utility payment amount;

an output coupled to a central station by which the customer code identifier, the identity of the utility service provider and the utility payment amount are supplied to the central station to cause a quantity of money to be sent to the utility service provider on behalf of the customer.

13. The system of claim 12, further comprising a printing device to print a receipt identifying the utility payment amount, the identity of the utility service provider and the customer code identifier.

14. The system of claim 13, wherein the printing device is controlled by the processor to print the receipt.

15. The system of claim 12, wherein the output is implemented as a communication device and wherein the communication device is controlled by the processor.

16. The system of claim 12, further comprising an input implemented as a keypad coupled to a cash register.

17. The system of claim 12, further comprising an input implemented as a scanning device.

18. The system of claim 17, wherein the customer code identifier is formatted as a barcode.

19. The system of claim 12, wherein the customer code identifier comprises a customer account number.

20. The system of claim 12 further comprising a payment service apparatus to receive the customer code identifier, the identity of the utility service provider and the utility payment amount from the retail store.

21. The system of 12 wherein the utility payment amount comprises a service fee added by the processor.

22. The system of claim 12, wherein the quantity of money is a first quantity of money, and the utility payment amount comprises a service fee added by the processor and supplied to a payment service by the output to cause a second quantity of money equal to the service fee to be paid to the payment service.

23. The system of claim 12, wherein the processor is implemented as a POS controller.

24. The system of claim 12, wherein the output is implemented as a communication device.

25. A point of sale (POS) controller disposed at a retail store and coupled to a cashier terminal and a communication device, the POS controller comprising:

an input to receive from the cashier terminal, a PLU, a customer code identifier and a utility payment amount, at least a portion of the utility payment amount being at least a portion of the cost of a utility service provided to a customer;

a processor programmed to recognize the PLU as being associated with a utility service provider, to accept the customer code identifier in response to recognizing that the PLU is associated with a utility service provider, to determine an identity of the associated utility service provider using the PLU, to accept the utility payment amount and to cause the communication device to supply the customer code identifier, the identity of the utility service provider and the utility payment amount to a payment system to cause a quantity of money to be sent to the utility service provider on behalf of the customer.

26. The POS controller of claim 25, wherein the cashier terminal is controlled by the processor to print a receipt identifying the utility payment amount, the identity of the utility service provider and the customer code identifier.

27. The POS controller of claim 25, wherein the customer code identifier comprises a customer account number.

28. The POS controller of claim 25, wherein the utility payment amount comprises a service fee added by the processor.

* * * * *